(12) United States Patent
Chung et al.

(10) Patent No.: US 9,576,484 B2
(45) Date of Patent: Feb. 21, 2017

(54) SYSTEM AND METHOD FOR MONITORING VEHICULAR TRAFFIC WITH A LASER RANGEFINDING AND SPEED MEASUREMENT DEVICE UTILIZING A SHAPED DIVERGENT LASER BEAM PATTERN

(75) Inventors: Jiyoon Chung, Aurora, CO (US); Jeremy G. Dunne, Parker, CO (US)

(73) Assignees: Laser Technology, Inc., Centennial, CO (US); Kama-Tech (HK) Limited, Tsim Sha Tsui, Hong Kong (CN)

(*) Notice: Subject to any disclaimer, the term of this patent is extended or adjusted under 35 U.S.C. 154(b) by 366 days.

(21) Appl. No.: 13/411,219

(22) Filed: Mar. 2, 2012

(65) Prior Publication Data
US 2013/0229644 A1 Sep. 5, 2013

(51) Int. Cl.
| | |
|---|---|
| *G01C 3/08* | (2006.01) |
| *G08G 1/052* | (2006.01) |
| *G01P 3/68* | (2006.01) |
| *G01S 17/58* | (2006.01) |
| *G01S 17/88* | (2006.01) |
| *G01S 7/481* | (2006.01) |

(52) U.S. Cl.
CPC .......... *G08G 1/052* (2013.01); *G01P 3/68* (2013.01); *G01S 7/481* (2013.01); *G01S 17/58* (2013.01); *G01S 17/88* (2013.01)

(58) Field of Classification Search
CPC .......... G01S 17/88; G01S 7/481; G01S 17/58; G01P 3/68; G08G 1/052
USPC ............ 356/3.01–3.16, 4.01–4.1, 5.01–5.15, 28,356/28.5
See application file for complete search history.

(56) References Cited

U.S. PATENT DOCUMENTS

| | | | |
|---|---|---|---|
| 5,221,956 A | * | 6/1993 | Patterson et al. ............... 356/28 |
| 5,574,552 A | | 11/1996 | Dunne |
| 5,612,779 A | | 3/1997 | Dunne |
| 5,652,651 A | | 7/1997 | Dunne |
| 5,703,678 A | | 12/1997 | Dunne |
| 5,880,821 A | | 3/1999 | Dunne |

(Continued)

FOREIGN PATENT DOCUMENTS

| | | |
|---|---|---|
| JP | 201014706 A | 1/2010 |
| WO | 9634252 | 10/1996 |

OTHER PUBLICATIONS

Cheng et al. "A Real-Time Laser-Based Detection System for Measurement of Delineations of Moving Vehicles", IEEE, Jun. 2001.*

(Continued)

*Primary Examiner* — Luke Ratcliffe
*Assistant Examiner* — Assres H Woldemaryam
(74) *Attorney, Agent, or Firm* — William J. Kubida; Peter J. Meza; Hogan Lovells US LLP (57) ABSTRACT

A system and method for monitoring vehicular traffic with a laser rangefinding and speed measurement device utilizing a shaped divergent laser beam pattern. In accordance with the present invention, a traffic monitoring device is disclosed which comprises a light emitting diode having a die element producing an asymmetric beam pattern, an aperture for at least partially precluding some portion of the beam pattern in a first direction while allowing the beam pattern in a second orthogonal direction to pass therethrough and a lens associated with the aperture for causing the laser beam exiting the aperture to diverge providing a cone-like beam of laser energy.

20 Claims, 9 Drawing Sheets

(56) References Cited

U.S. PATENT DOCUMENTS

| | | | |
|---|---|---|---|
| 6,057,910 A | 5/2000 | Dunne | |
| 6,226,077 B1 | 5/2001 | Dunne | |
| 6,301,003 B1* | 10/2001 | Shirai et al. | 356/4.01 |
| 6,445,444 B2 | 9/2002 | Dunne | |
| 6,707,391 B1* | 3/2004 | Monroe | G08G 1/0965 340/901 |
| 6,985,212 B2* | 1/2006 | Jamieson et al. | 356/5.01 |
| 7,375,801 B1* | 5/2008 | Briscoe et al. | 356/3.1 |
| 7,616,293 B2* | 11/2009 | Sirota et al. | 356/28 |
| 8,427,632 B1* | 4/2013 | Nash et al. | 356/3.1 |
| 2003/0042303 A1* | 3/2003 | Tsikos et al. | 235/384 |
| 2003/0080192 A1* | 5/2003 | Tsikos et al. | 235/462.14 |
| 2004/0233414 A1* | 11/2004 | Jamieson et al. | 356/4.01 |
| 2006/0017939 A1* | 1/2006 | Jamieson et al. | 356/622 |
| 2006/0274299 A1* | 12/2006 | Matsuura et al. | 356/4.01 |
| 2008/0002176 A1* | 1/2008 | Krasutsky | 356/4.01 |
| 2009/0033757 A1* | 2/2009 | Shimada | 348/222.1 |
| 2010/0128243 A1* | 5/2010 | Liebman et al. | 356/3 |
| 2010/0228517 A1* | 9/2010 | Wike et al. | 702/149 |
| 2012/0226268 A1* | 9/2012 | Liu | A61B 18/203 606/9 |

OTHER PUBLICATIONS

Serkan et al. "Optical beam-shaping design based on aspherical lenses for circularization, collimation, and expansion of elliptical laser beams", Auburn University, 2008.*
ISR and Written Opinion of the International Searching Authority, PCT/US2013/028658, mailing dated May 29, 2013, 14 pgs.
Australian Patent Examination Report No. 1 for Patent Application No. 2013225756, dated Jan. 8, 2016, 3 pages.
Australian Patent Examination Report No. 2 for Patent Application No. 2013225756, dated Feb. 18, 2016, 3 pages.

* cited by examiner

SYSTEM AND METHOD FOR MONITORING VEHICULAR TRAFFIC WITH A LASER RANGEFINDING AND SPEED MEASUREMENT DEVICE UTILIZING A SHAPED DIVERGENT LASER BEAM PATTERN

BACKGROUND OF THE INVENTION

The present invention relates, in general, to the field of systems and methods for monitoring vehicular traffic. More particularly, the present invention relates to a system and method for monitoring vehicular traffic with a laser rangefinding and speed measurement device utilizing a shaped divergent laser beam pattern.

Police have been using radar and laser speed measurement devices to determine vehicle speed in traffic enforcement operations for many years now. With respect to radar based devices, they generally function such that a microwave signal is emitted toward a moving vehicle and a reflection from the target returned to the device which then uses the determined Doppler shift in the return signal to determine the vehicle's speed. Radar based devices have an advantage over laser based speed guns in that they emit a very broad signal cone of energy and do not therefore, require precise aiming at the target vehicle. As such, they are well suited for fixed and mobile applications while requiring little, if any, manual operator aiming of the device. However, the broad beam of energy they emit precludes their ability to readily distinguish between adjacent vehicles on a multi-lane roadway On the other hand, laser based speed guns employ the emission of a series of short pulses comprising a very narrow beam of monochromatic laser energy and then measure the flight time of the pulses from the device to the target vehicle and back. These laser pulses travel at the speed of light which is on the order of 984,000,00 ft./sec. or approximately 30 cm/nsec. Laser based devices then very accurately determine the time from when a particular pulse was emitted until the reflection of that pulse is returned from the target vehicle and divide it by two to determine the distance to the vehicle. By emitting a series of pulses and determining the change in distance between samples, the speed of the vehicle can be determined very quickly and with great accuracy.

While laser diodes themselves emit a somewhat divergent beam, laser rangefinders and speed guns have collimated that beam using an aspheric lens to reduce the beam width to on the order of 2 to 3 milliradians. Because of the narrow beam width employed, such devices have heretofore been predominantly relegated to hand held units which must be manually aimed at a specific target vehicle. That being the case, they have not been able to be employed in autonomous applications wherein an operator is not manually aiming the device.

In conventional fixed and semi-fixed uses of laser based speed detection devices, such as overpass mounted applications, it is important that the laser pulses be directed to a single point on an approaching target vehicle inasmuch as the frontal surface angles can vary between, for example, that of the grille ($\theta_1$) and the windshield ($\theta_2$) Where the distance to the target vehicle as measured by the laser based device is a distance M at an angle $\phi$ and the true distance to the target is D, D is then equal to $M*(COS \phi + SIN \phi/TAN(\theta_1$ or $\theta_2))$.

Thus, the true distance D can vary, and hence the calculated speed of the target vehicle. Normally, the angle $\phi$ is less than 10° and COS $\phi$ is then almost 1. This can reduce the calculated speed of the target vehicle, in effect giving a 1% to 2% detected speed advantage to the target vehicle as indicated below with respect to the "cosine effect". However, the cosine effect can be minimized if an accurate tracking trajectory is maintained. On the other hand, it should be noted that the value of SIN $\phi/TAN(\theta_1$ or $\theta_2)$ can be greater than a normally acceptable error margin (e.g., 0.025 (2.5%)) and an even larger error can be encountered if the laser pulses are not consistently aimed at a single point on the target vehicle. As used herein, the SIN $\phi/TAN(\theta_1$ or $\theta_2)$ portion of the equation is referred to as a geometric error.

Both radar and laser based speed measurement devices can be used to measure the relative speed of approaching and receding vehicles from both fixed and mobile platforms. If the target vehicle is traveling directly (i.e. on a collision course) toward the device, the relative speed detected is the actual speed of the target. However, as is most frequently the case, if the vehicle is not traveling directly toward (or away from) the device but at an angle ($\alpha$), the relative speed of the target with respect to that determined by the device will be slightly lower than its actual speed. This phenomenon is known as the previously mentioned cosine effect because the measured speed is directly related to the cosine of the angle between the speed detection device and the vehicle direction of travel. The greater the angle, the greater the speed error and the lower the measured speed. On the other hand, the closer the angle ($\alpha$) is to 0°, the closer the measured speed is to actual target vehicle speed.

SUMMARY OF THE INVENTION

It would therefore be highly advantageous to provide a system and method for monitoring vehicular traffic with a laser rangefinding and speed measurement device which did not require manual aiming at a particular vehicle in a particular lane of traffic but could continuously, autonomously and selectively distinguish activity in a selected lane without manual intervention. Such a system is disclosed and claimed herein utilizing a novel shaped divergent laser beam pattern.

The system and method of the present invention may be implemented in a fixed application on a highway overpass or on a pole adjacent the roadway. Moreover, the system and method of the present invention may also be utilized in an aerial based mode for utilization in a helicopter, drone or other airborne mode wherein the velocity of the platform itself can be compensated for with, for example, global positioning system (GPS) data, inertial data and the like.

The system and method of the present invention can also be utilized with an associated video and/or still camera to document for evidentiary purposes any approaching or receding vehicles having been within the active zone defined by the shaped divergent laser beam pattern. Such a system may be implemented utilizing the principles as disclosed and claimed, for example, in U.S. Pat. No. 7,920,251 for "Integrated Still Image, Motion Video and Speed Measurement System" assigned to Laser Technology, Inc., assignee of the present invention. In addition to the determination of the speed and relative distances of target vehicles, the system and method of the present invention is likewise applicable to the monitoring of vehicular red signal light compliance, stop sign compliance, school zone activity and the like.

The system and method of the present invention can be applied to the underlying principles of pulse-based laser rangefinding and speed measurement devices such as those currently available from Laser Technology, Inc., assignee of the present invention. Representative circuitry and associated signal processing techniques for such a pulse-based laser range finder are disclosed, for example, in the following U.S. Pat. Nos. 5,574,552; 5,612,779; 5,652,651; 5,703,678; 5,880,821; 6,057,910; 6,226,077 and 6,445,444. The disclosures of these patents are herein specifically incorporated by this reference in their entirety.

Particularly disclosed herein is a traffic monitoring device which comprises a source of laser light, a lens for causing the laser light to diverge toward a target and a mask associated with the source of laser light and the lens for at least partially precluding some portion of the laser light from exiting the lens.

Also particularly disclosed herein is a method for monitoring moving objects which comprises projecting a divergent laser beam toward the moving object, measuring a round trip flight time of the laser beam to and from the moving object, and determining the distance to the moving object based upon one half of the round trip flight time. In a more particular embodiment of the present invention the method also comprises repeating the steps of measuring and determining and calculating a speed of the moving object based upon a plurality of the distance determinations over a time interval between the repeated steps of measuring and determining.

Still further disclosed herein is a method for calculating the speed of a moving object comprising successively measuring distances to the moving object and if the time between successive measurements is greater than a determined time interval, calculating a speed of the moving object based upon the time between the successive measurements and the distance traveled there between; and if the distance to the moving object between the successive measurements is greater than a determined distance, calculating the speed of the moving object based upon the distance traveled between the successive measurements and the time between the successive measurements.

Also further disclosed herein is a traffic monitoring device which comprises a light emitting diode having a die element producing an asymmetric beam pattern of greater divergence in a first direction than in a second orthogonal direction, an aperture for at least partially precluding some portion of the beam pattern in the first direction and allowing the beam pattern in the second direction to pass therethrough; and a lens associated with the aperture for causing the laser beam exiting the aperture to diverge toward a target.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
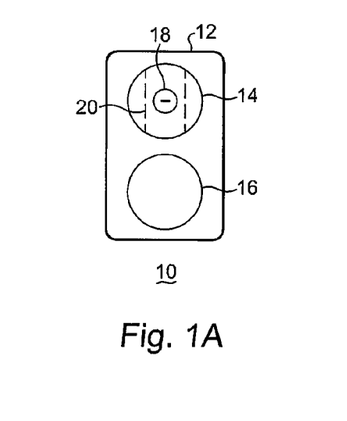
FIGS. 1A and 1B are respective front and side elevational views of a traffic monitoring device in accordance with the system and method of the present invention for producing a shaped divergent laser beam pattern.
Figure 1B:
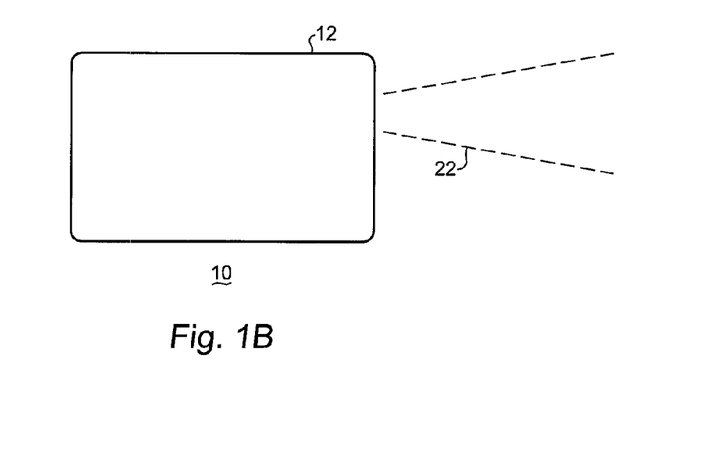

With reference now to FIGS. 1A and 1B, respective front and side elevational views of a traffic monitoring device 10 in accordance with the system and method of the present invention are shown. The traffic monitoring device 10 is operational to produce a shaped divergent laser beam pattern as will be more fully described hereinafter. Unlike conventional laser distance and range finding devices, the traffic monitoring device 10 of the present invention does not emit a collimated beam, for example through the use of an aspheric lens, in order to reduce the beam width.

The traffic monitoring device 10 comprises a housing 12 having a laser beam transmission aperture 14 and a reflected laser beam reception aperture 16. The source of laser light for measuring distance and speed of a target vehicle is a laser diode 18 which, in the embodiment illustrated, has its laser emitting die element oriented in a generally horizontally disposed position. By positioning the laser emitting die element of the laser diode 18 in this orientation, the exit beam pattern is effectively shaped as indicated by the two vertical boundaries 20 as it exits the device 10. This is because the laser light pattern from the laser diode 18 is inherently asymmetric and exits the laser beam transmission aperture 14 with a divergence of approximately 25° to 28° in the vertical direction and approximately 8° to 10° in the horizontal direction.

In alternative embodiments of the present invention, the vertical boundaries 20 may alternatively, or additionally, be defined by a mask disposed between the laser diode 18 and the laser beam transmission aperture 14 for partially precluding lateral portions of the laser light from exiting from the laser beam transmission aperture 14 thereby aiding in the production of a shaped divergent laser beam pattern 22 in conjunction with an appropriate lens. It should also be noted that such a mask for defining the vertical boundaries 20 may also be applied externally to the laser beam transmission aperture 14 lens.

Figure 2A:
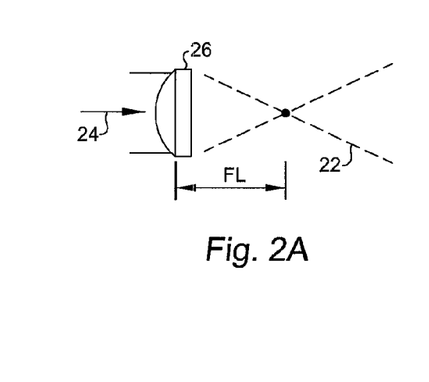
FIGS. 2A through 2D inclusive are simplified representations of various lens configurations and lenses for producing a divergent laser beam pattern from the output of a laser diode.
Figure 2B:
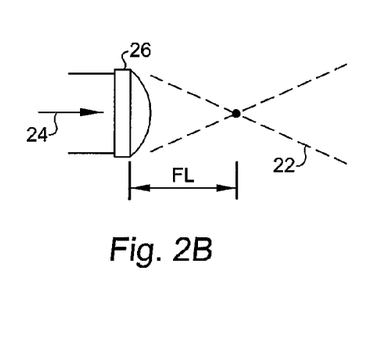

With reference additionally now to FIGS. 2A through 2D inclusive, simplified representations of various lens configurations and lenses for producing a divergent laser beam pattern from the output of the laser diode 18 (FIGS. 1A and 1B) are shown. With particular reference to FIGS. 2A and 2B, laser light 24 is directed toward a plano-convex lens 26 oriented alternatively as shown to produce a divergent laser beam pattern 22. In these configurations, the laser light 24 is focused toward a point at a focal length FL. While such plano-convex lens configurations may be used in implementing an embodiment of the present invention, they have the disadvantage of possibly exceeding eye safety limits at the focal point indicated.

Figure 2C:
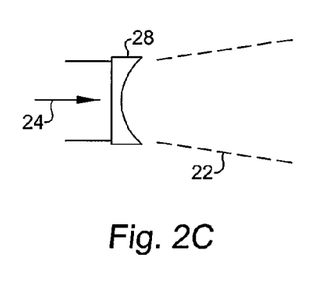
Figure 2D:
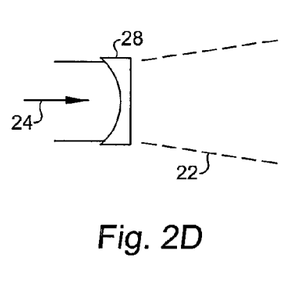

With particular reference to FIGS. 2C and 2D, further alternative configurations for producing a divergent laser beam pattern 22 are shown utilizing, for example, a plano-concave lens 28 which produce a divergent laser beam pattern 22 from the laser light 24. The embodiments of FIGS. 2C and 2D obviate any possible eye safety concerns by eliminating the focus of the laser light 24 at a point as with the plano-convex lens of FIGS. 2A and 2B.

Figure 3A:
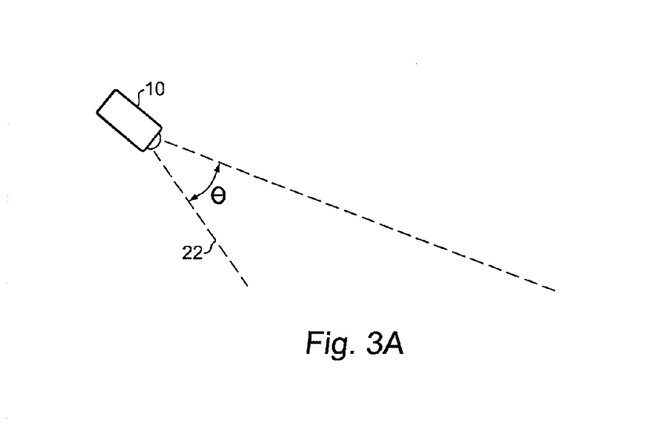
FIG. 3A is a simplified representation of the output of a traffic monitoring device indicating a representative angle for a divergent laser beam produced in accordance with the system and method of the present invention.

With reference additionally now to FIG. 3A, a simplified representation of the output of a traffic monitoring device 10 is shown indicating a representative angle for a shaped divergent laser beam 22 produced in accordance with the system and method of the present invention. A typical laser range finder employs a single aspheric lens to produce a highly collimated beam of approximately 2 to 3 milliradians. Utilizing any of the lens configurations of FIGS. 2A through 2C a divergent laser beam pattern 22 is produced of on the order of substantially 50 to 100 milliradians although a somewhat greater or lesser beam pattern can be provided in accordance with the system and method of the present invention without departing from the spirit and scope disclosed and claimed herein.

Figure 3B:
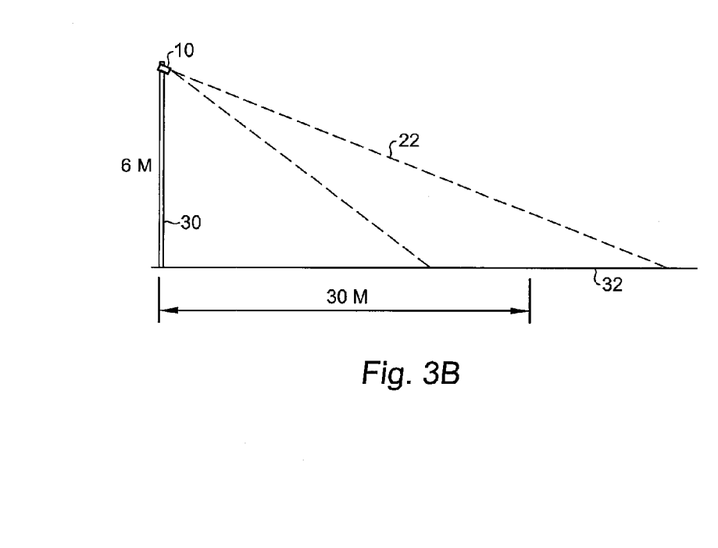
FIG. 3B is a simplified side view illustrating the device of the preceding figure affixed to a pole adjacent a roadway as well as the divergent laser beam pattern produced thereby.

With reference additionally now to FIG. 3B in particular, mounting the traffic monitoring device 10 on a pole 30 at a height of 6 meters above and adjoining a roadway 32 provides a shaped divergent laser beam pattern 22 with an active zone centered substantially 30 meters from the pole 30, depending upon the angle at which the traffic monitoring device 10 is positioned.

Figure 4:
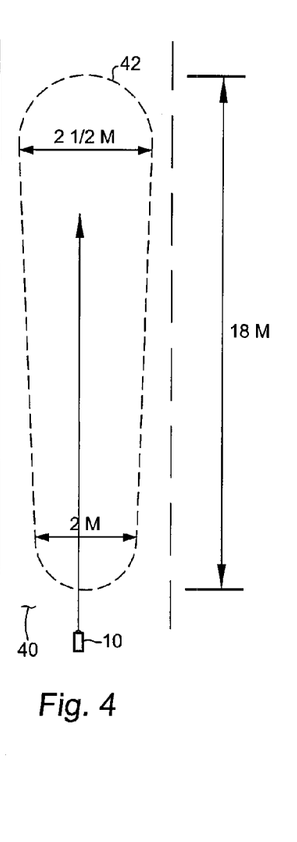
FIG. 4 is an overhead view of a particular lane of traffic in a roadway together with the shaped divergent laser beam pattern projected thereon when a traffic monitoring device of the present invention is mounted, for example, on an overpass over the particular traffic lane.

With reference additionally now to FIG. 4, an overhead view of a particular lane of traffic 40 in a roadway is shown together with a shaped divergent laser beam pattern 42 projected thereon when a traffic monitoring device 10 of the present invention is mounted, for example, on an overpass over the particular lane of traffic 40. In this particular configuration of the system and method of the present invention, the shaped divergent laser beam pattern 42 is substantially 18 meters in length and has a distal width of substantially 2.5 meters and a proximal width of substantially 2.0 meters. The length is a function of the lens system utilized together with the height of the traffic monitoring device above the lane of traffic 40 an the angle at which the beam is projected onto the roadway. The width is a function of the width of the opening provided by mask 20 (FIG. 1A) employed in a particular embodiment of the traffic monitoring device 10.

Figure 5:
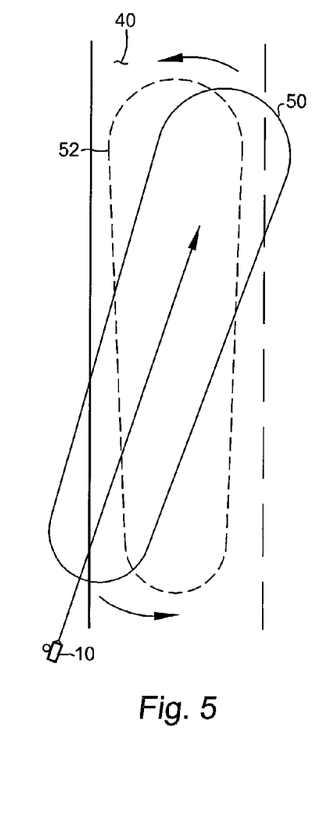
FIG. 5 is an alternative overhead view of a particular lane of traffic in a roadway together with the shaped divergent laser beam pattern projected thereon when a traffic monitoring device of the present invention is mounted, for example, to a pole adjacent the particular lane of traffic and further indicating how the shaped divergent laser beam can be aligned with the traffic lane by rotational mounting of the device to the pole.

With reference additionally now to FIG. 5, an alternative overhead view of a particular lane of traffic 40 in a roadway is shown together with the shaped divergent laser beam pattern projected thereon when a traffic monitoring device of the present invention is mounted, for example, to a pole adjacent the particular lane of traffic. This figure illustrates how the shaped divergent laser beam 50 can be aligned with the traffic lane to position 52 by rotational mounting of the traffic monitoring device 10 to the pole.

With respect to FIGS. 4 and 5, it can be seen that, in accordance with the system and method of the present invention, a particular lane of traffic can be selectively monitored to the exclusion of adjacent lanes such that only vehicles traveling in the monitored lane are selected for establishing its speed and/or position.

Figure 6A:
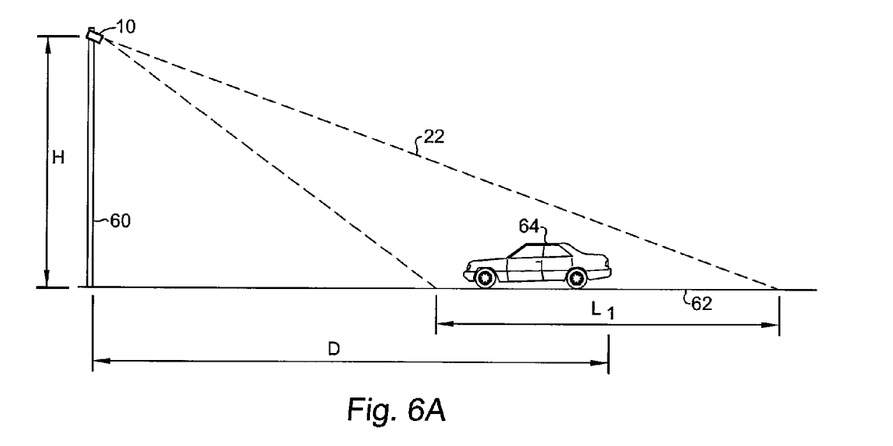
FIG. 6A is a side plan view illustrating a traffic monitoring device in accordance with the present invention mounted on a pole adjacent a roadway projecting a divergent laser beam thereupon having an active zone of length $L_1$ and including a vehicle within the active zone.

With reference additionally now to FIG. 6A, a side plan view illustrating a traffic monitoring device 10 in accordance with the present invention is shown mounted at a height H on a pole 60 adjacent a roadway 62 projecting a divergent laser beam 22 thereupon centered at a distance D form the pole 60 having an active zone of length $L_1$ and including a vehicle 64 within the active zone.

Figure 6B:
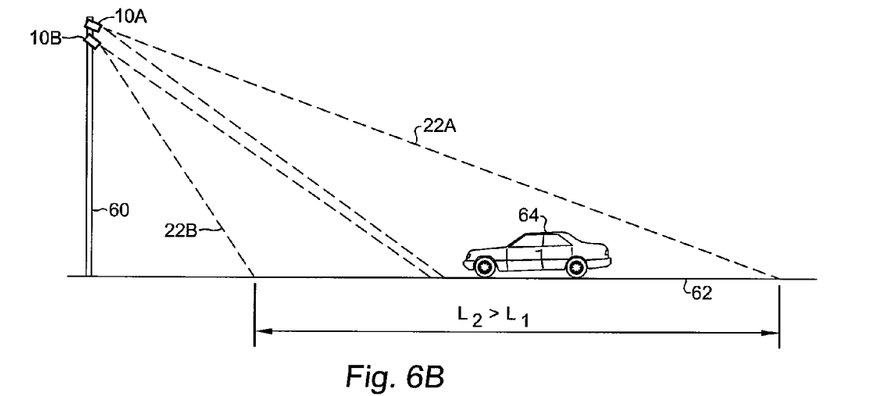
FIGS. 6B and 6C are side plan views illustrating a pair of traffic monitoring devices in accordance with the present invention mounted on a pole adjacent a roadway and projecting a pair of divergent laser beams thereupon having a combined effective active zone of length $L_2$.

With reference additionally now to FIG. 6B, a side plan view illustrating a pair of traffic monitoring devices 10A and 10B in accordance with the present invention is shown mounted on a pole 60 adjacent a roadway 62 and projecting a pair of divergent laser beams 22A and 22B thereupon having a combined effective active zone of length $L_2$ greater than the active zone length $L_1$ of the preceding figure.

Figure 6C:
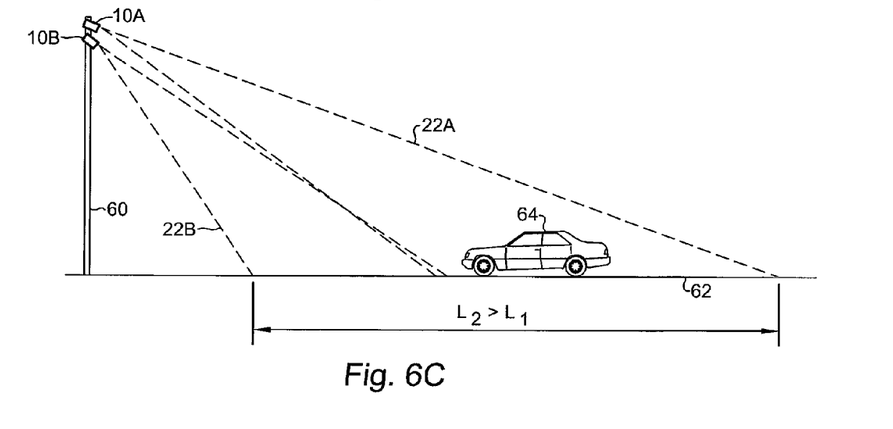

The traffic monitoring devices 10A and 10B can be synchronized with respect to the timing of emissions producing the divergent laser beams 22A and 22B to obviate interference between the two with the ultimate calculation of vehicle 64 speed determined from the output of both. FIG. 6C shows that an overlap of the pair of divergent laser beams 22A and 22B can be provided as well. In the embodiments of FIGS. 6A, 6B and 6C, the relative distance of the vehicle 64 from the traffic monitoring device 10 (or devices 10A and 10B) for calculating speed would be appropriately compensated for position error through basic trigonometric functions.

The traffic monitoring devices 10A and 10B may be mounted, for example, with a predefined angle between them of about 3.5 degrees with each measuring distances about every 5 milliseconds. As previously mentioned, the traffic monitoring devices 10A and 10B may be operated alternately. One of the traffic monitoring devices 10A and 10B would then gather data from the other one as well and calculate distance and apply the appropriate trigonometric corrections. This then provides one series of distances from both units.

Figure 6D:
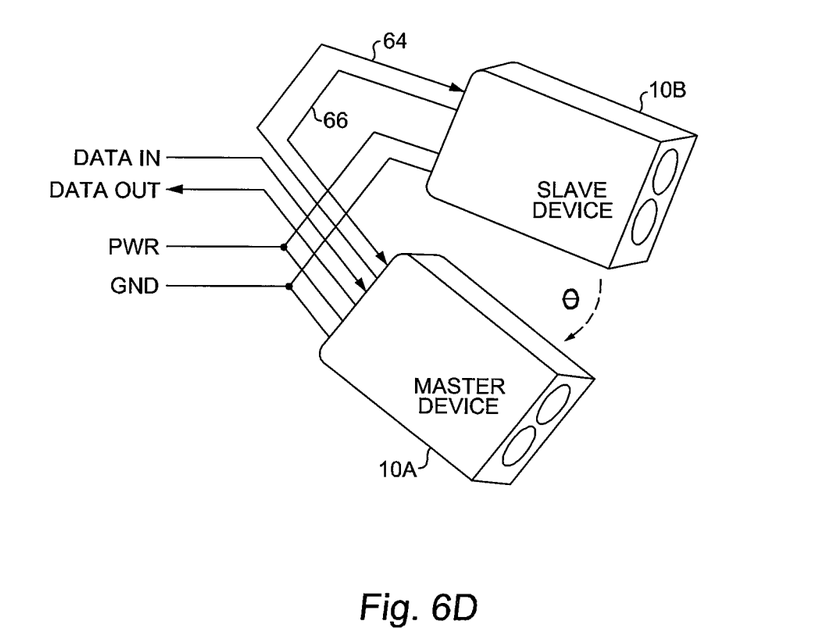
FIGS. 6D and 6E are detailed views of a pair of devices in accordance with the present invention as depicted in the preceding figure and showing alternative mounting arrangements of the devices in a master/slave configuration.
Figure 6E:
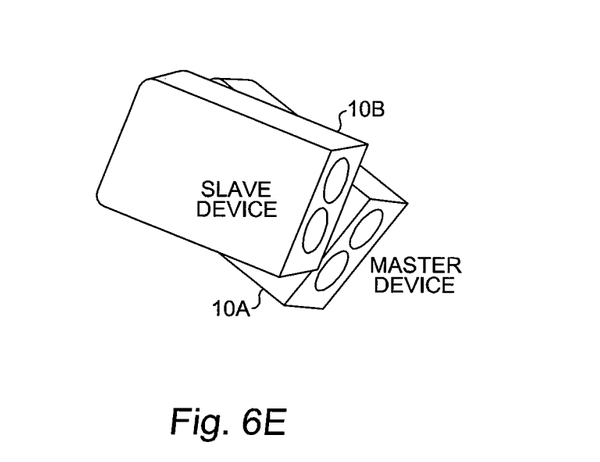

With reference additionally now to FIGS. 6D and 6E, detailed views of a pair of traffic monitoring devices 10A and 10B in accordance with the present invention are shown as depicted in the preceding figure showing alternative mounting arrangements of the devices 10A and 10B in a master/slave configuration. It should be noted that either of the traffic monitoring devices 10A and 10B may be the master device or the slave device and produce either of the patterned divergent laser beams 22A or 22B shown in FIGS. 6B and 6C.

Referring specifically to FIG. 6D, the traffic monitoring devices 10A and 10B are defined as a master device and slave device respectively and are aligned with an angle θ between them of on the order of 3.5 degrees as previously described. The traffic monitoring devices 10A and 10B receive power (PWR) and ground (GND) powering signals while the master traffic monitoring device 10A receives data in signals and provides a laser fire timing signal 64 to the slave traffic monitoring device 10B. The slave traffic monitoring device 10B provides a data communication signal 66 to the master traffic monitoring device 10A which provides a data out signal to any associated circuitry and components (not shown) which may comprise one or more computers, cameras, printers, communications devices, storage devices and the like.

Figure 7A:
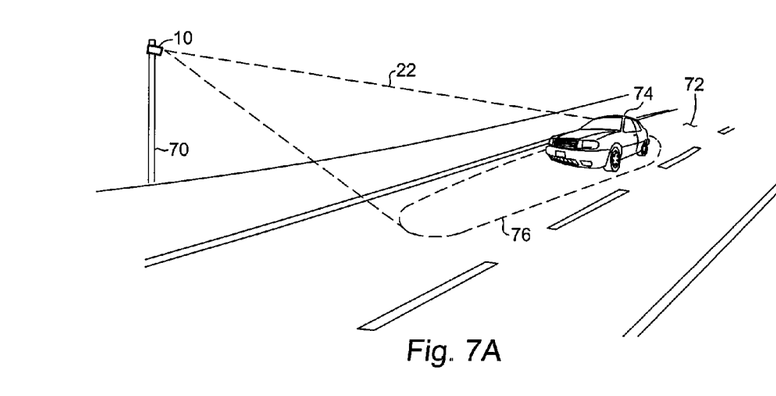
FIGS. 7A and 7B are perspective and overhead views of the device of FIG. 6A illustrating the shaped divergent laser beam pattern projected upon a particular lane of traffic in the roadway for monitoring, for example, the speed of the vehicle within the projected active zone.
Figure 7B:
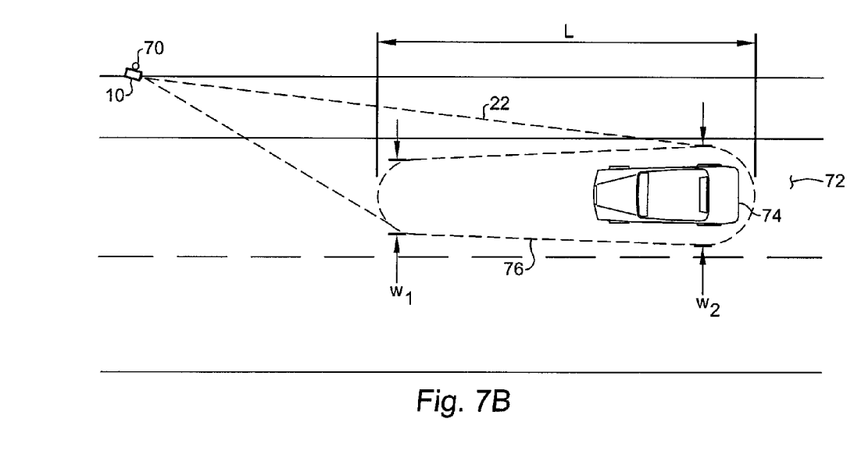

With reference additionally now to FIGS. 7A and 7B, perspective and overhead views of the traffic monitoring device 10 of FIG. 6A mounted on a pole 70 are shown illustrating the shaped divergent laser beam pattern 22 projected upon a particular lane of traffic 72 in the roadway for monitoring, for example, the speed of s vehicle 74 within the projected active zone 76. As illustrated, the active zone 74 can be defined as having a length L and a proximal width of $W_1$ and a distal width of $W_2$.

Figure 8A:
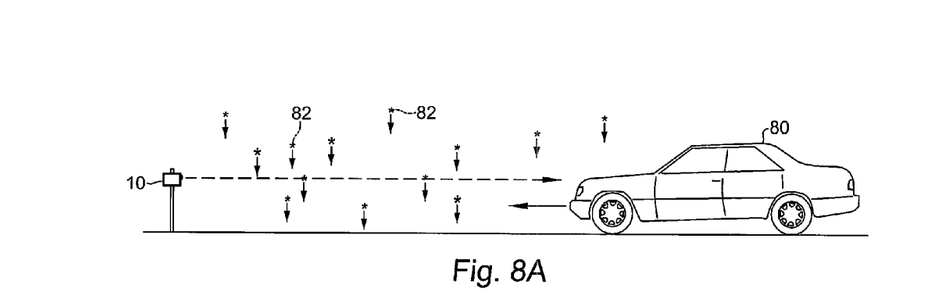
FIGS. 8A through 8C inclusive are simplified illustrations of how the traffic monitoring device of the present invention would serve to reject intervening precipitation or other particles interposed between the device and the vehicle to be monitored due to their randomly occurring rate of fall.
Figure 8B:
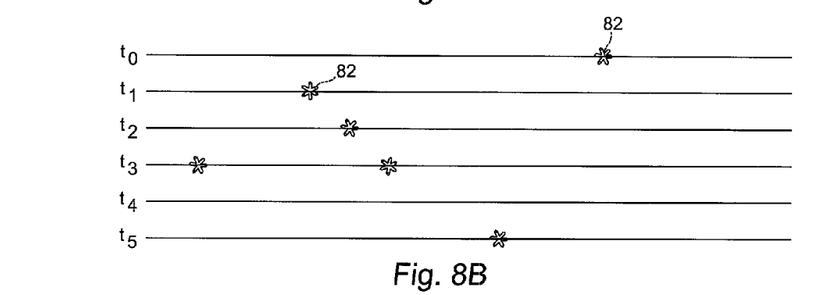
Figure 8C:
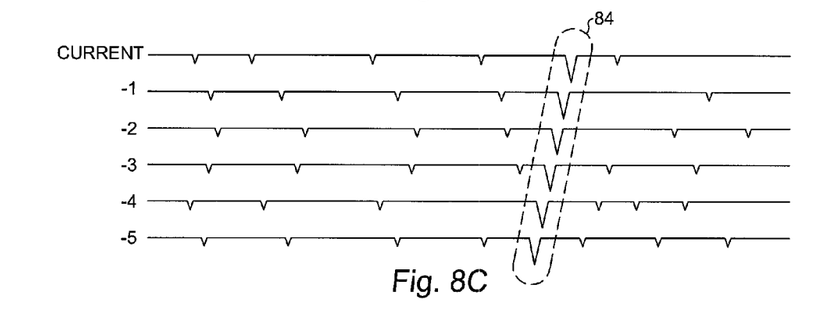

With reference additionally now to FIGS. 8A through 8C inclusive, simplified illustrations of how the traffic monitoring device 10 of the present invention would serve to reject intervening precipitation or other particles 80 interposed between the traffic monitoring device 10 and s vehicle 80 to be monitored due to their randomly occurring rate of fall are shown. In this illustration, the precipitation is represented as being snowflakes 82 which have a relatively small size with respect to the target vehicle 80. As larger snowflakes 82 might be encountered (on the order of 0.25 to 0.5 inches in diameter) it is noted that they also fall more slowly than smaller flakes. As the return signals to the traffic monitoring device 10 from the snowflakes 82 would be smaller and occur at more random intervals than the return signals from the vehicle 80 as it changes position, the traffic monitoring device 10 would factor out the returns from the snowflakes 82 and look for the best fit between successive return signals at grouping 84 in order to selectively identify the vehicle 80.

Figure 9A:
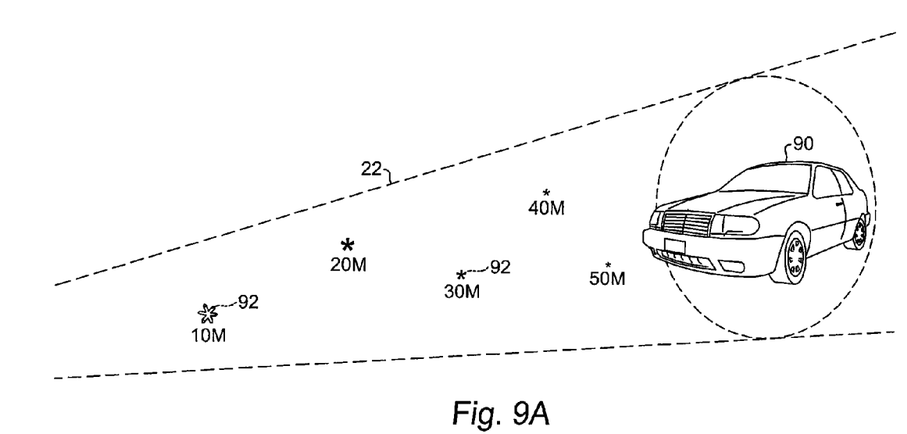
FIGS. 9A and 9B are simplified illustrations of how the traffic monitoring device of the present invention would also serve to reject intervening precipitation or other particles interposed between the device and the vehicle to be monitored due to their randomly occurring position beyond a certain hold-off range.
Figure 9B:
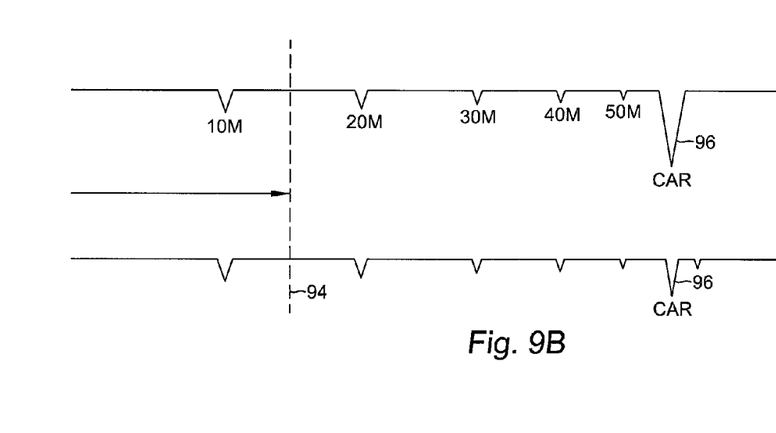

With reference additionally now to FIGS. 9A and 9B, simplified illustrations are shown of how the traffic monitoring device 10 (not shown) of the present invention projecting a shaped divergent laser beam 22 might also serve to reject intervening precipitation or other particles 92 interposed between the device and the vehicle 90 to be monitored due to their randomly occurring position beyond a certain hold-off range 94. In this example, the particles 92 are again represented as snowflakes which occur at various distances between the traffic monitoring device 10 and the target vehicle 90 with the intensity of the signal returns from particles farther from the traffic monitoring device 10 being of necessity smaller than those of closer ones. A hold-off range 94 can be established to ignore all returns that occur within a specified range as being not of interest even if the return pulses from particles 92 very close to the traffic monitoring device might be relatively strong. Since the vehicle 90 is more highly reflective than the particles 92, the return signals 96 to the traffic monitoring device would have a greater signal strength even at a greater distance.

Figure 10:
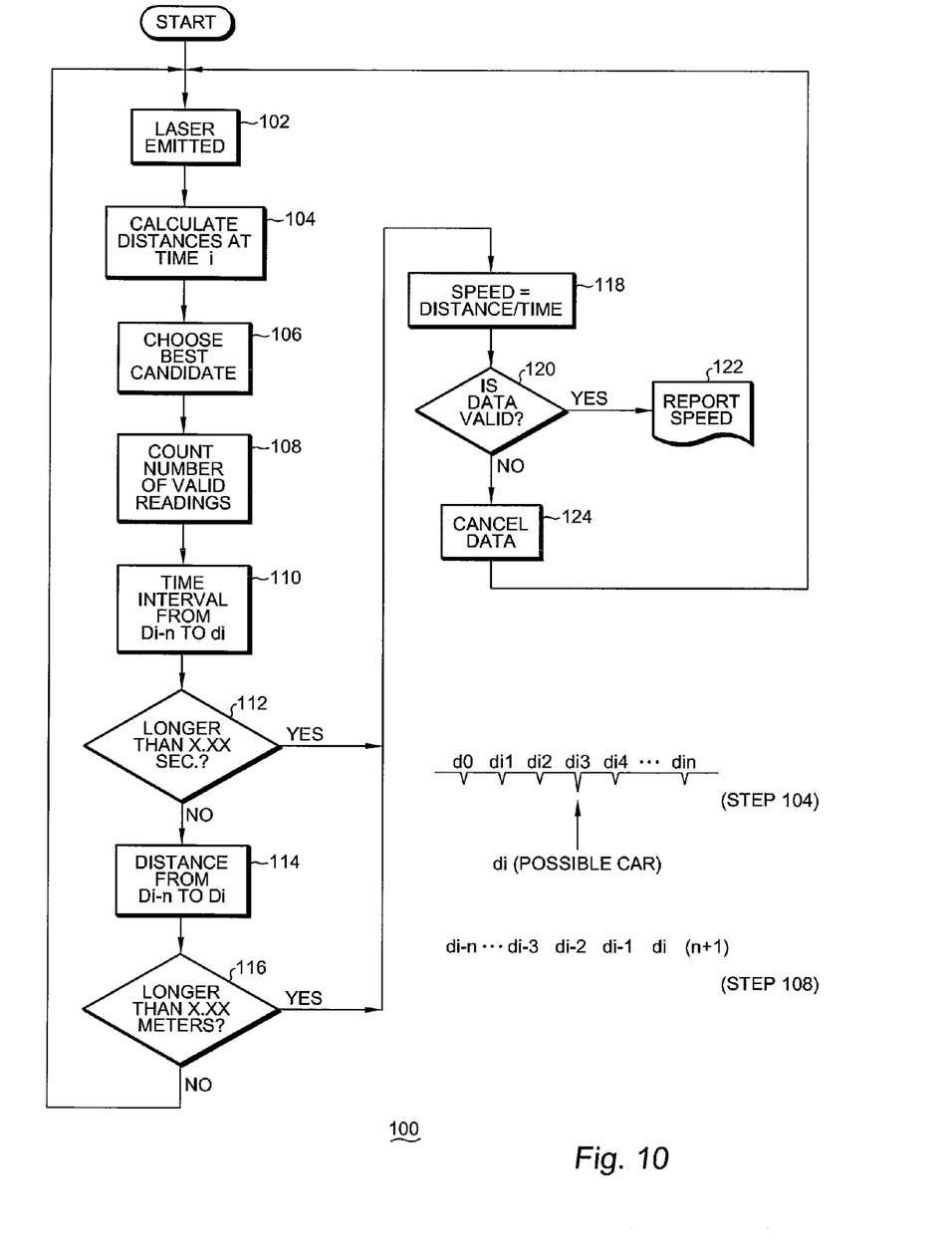
FIG. 10 is a logic flowchart illustrating a possible process for determining the speed of a vehicle utilizing a traffic monitoring device implementing the system and method of the present invention.

With reference additionally now to FIG. 10, a logic flowchart illustrating a possible process 100 for determining the speed of a vehicle utilizing a traffic monitoring device implementing the system and method of the present invention is shown.

The process 100 is initiated at step 102 wherein a divergent laser beam is emitted toward a target car, vehicle or other moving object. Distances to the vehicle are calculated at a time "i" at step 104 where a possible target car at time di3 has been identified at step 106. The number of valid distance readings is then counted at step 108 and the time interval between distances di-n and di measured at step 110. If the time interval is greater than a determined number of seconds at decision step 112, the process 100 proceeds to step 118 to determine speed as the distance traveled over time. Otherwise, the process 100 proceeds to determine the distance from di-n to di at step 114.

At decision step 16, if the distance is longer than a determined distance then the process 100 also proceeds to determine speed as distance traveled over time at step 118. Otherwise, the process returns to step 102. At step 118, if the data derived is determined to be valid at decision step 120, then the speed of the vehicle is reported at step 122. If the data is not determined to be valid, then the data is cancelled at step 124 and the process 100 returns to step 102 again.

Figure 11A:
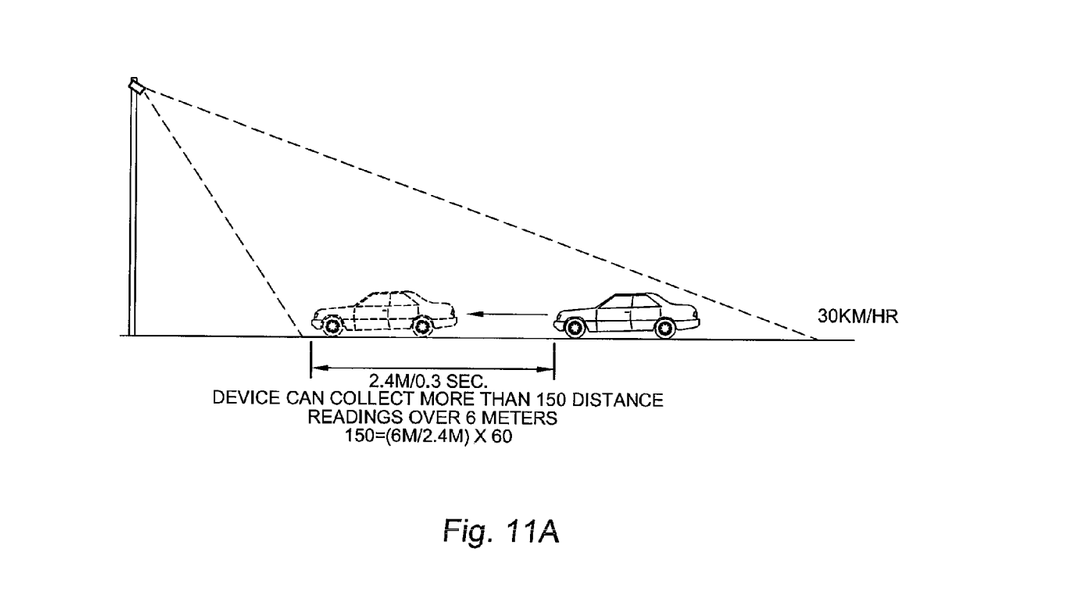
FIGS. 11A and 11B are exemplary illustrations of the utilization of the dual thresholds of time and distance shown in the preceding figure for monitoring vehicle speed in accordance with the system and method of the present invention.
Figure 11B:
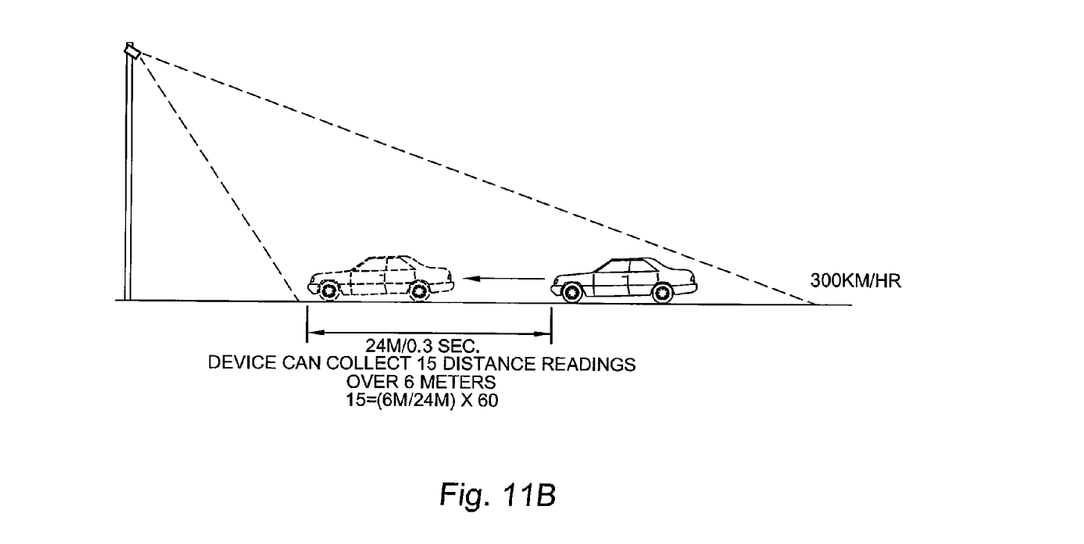

With reference additionally now to FIGS. 11A and 11B, exemplary illustrations of the utilization of the dual thresholds of time and distance shown in the preceding figure for monitoring vehicle speed in accordance with the system and method of the present invention are shown.

Utilizing a regression analysis to calculate speed, as an example, at least 60 distance measurements may be needed to calculate a vehicle's speed. In a fixed implementation of the system and method of the present invention, the minimum number of speed readings cannot be guaranteed should the speed of the vehicle be too fast. As an example, at 300 km/hr a vehicle will travel more than 24 meters in 0.3 seconds. If the active zone defined by the patterned divergent laser beam is less than 24 meters in length, the speed of the vehicle will not be detected. To ameliorate this situation, the system and method of the present invention utilizes dual thresholds with one based on time and the other on distance. If either of the two thresholds is exceeded, the calculation of vehicle speed commences.

While there have been described above the principles of the present invention in conjunction with specific devices, apparatus and techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A traffic monitoring device for vehicle speed determination comprising:
    a source of laser light pulses;
    a lens for causing light emitted by said source of laser light to diverge toward said vehicle, said light presenting a substantially oval beam pattern having a maximum width in a distal portion of the oval beam pattern and minimum width in a proximal portion of the oval beam pattern; and
    a mask associated with said source of laser light and said lens for at least partially precluding some portion of said light from exiting said lens and delineating divergent edge portions of said beam pattern, wherein said vehicle speed is determined by a time of flight calculation of said laser light pulses.

2. The traffic monitoring device of claim 1 wherein said source of laser light pulses comprises a laser diode.

3. The traffic monitoring device of claim 2 wherein said source of laser light pulses comprises a laser diode positioned with a die of said laser diode in a generally horizontally disposed position.

4. The traffic monitoring device of claim 1 wherein said mask comprises a slot having substantially parallel and spaced apart side portions disposed laterally of said source of laser light pulses.

5. The traffic monitoring device of claim 1 wherein said lens comprises a plano-concave lens.

6. The traffic monitoring device of claim 1 wherein said lens comprises a plano-convex lens.

7. The traffic monitoring device of claim 1 further comprising a receive aperture for reception of at least a portion of said projected laser light reflected from said vehicle.

8. The traffic monitoring device of claim 7 wherein said device is operative to calculate a distance of said vehicle based on a time elapsed between emission of said projected laser light and reception of said projected laser light reflected from said vehicle.

9. The traffic monitoring device of claim 8 wherein said distance is calculated by selectively ignoring any intervening precipitation or particles interposed between said vehicle and said device.

10. The traffic monitoring device of claim 8 wherein said device is operative to calculate a speed of said vehicle based upon a plurality of distance calculations over a given time interval.

11. The traffic monitoring device of claim 1 wherein said projected laser light pulses directed toward said target presents a generally vertical angle of substantially on the order of 50 to 100 milliradians.

12. A traffic monitoring device for vehicle speed determination comprising:
    a light emitting diode having a die element producing an asymmetric beam pattern of laser light pulses having a greater divergence in a first direction than in a second orthogonal direction;
    a lens associated with said light emitting diode for causing said laser light pulses to diverge toward a vehicle, said beam pattern being substantially oval in shape having a maximum width in a distal portion of the oval beam pattern and minimum width in a proximal portion of the oval beam pattern; and
    a mask associated with said light emitting diode and said lens for at least partially precluding some portion of said light from exiting said lens and delineating divergent edge portions of said beam pattern,
    wherein said vehicle speed is determined by a time of flight calculation of said laser light pulses.

13. The traffic monitoring device of claim 12 wherein said light emitting diode is positioned with said die element in a generally horizontally disposed position.

14. The traffic monitoring device of claim 12 wherein said lens comprises a plano-concave lens.

15. The traffic monitoring device of claim 12 wherein said lens comprises a plano-convex lens.

16. The traffic monitoring device of claim 12 further comprising a receive aperture for reception of at least a portion of said laser light pulses reflected from said vehicle.

17. The traffic monitoring device of claim 16 wherein said device is operative to calculate a distance of said vehicle based on a time elapsed between emission of said laser light pulses and reception of said laser light pulses reflected from said vehicle.

18. The traffic monitoring device of claim 17 wherein said distance is calculated by selectively ignoring any intervening precipitation or particles interposed between said vehicle and said device.

19. The traffic monitoring device of claim 17 wherein said device is operative to calculate a speed of said vehicle based upon a plurality of distance calculations over a given time interval.

20. The traffic monitoring device of claim 12 wherein said laser light pulses diverging toward said target presents a generally vertical angle of substantially on the order of 50 to 100 milliradians.

* * * * *